United States Patent
Petrakos et al.

(10) Patent No.: US 6,868,281 B1
(45) Date of Patent: Mar. 15, 2005

(54) DUAL DIALING MODE WIRELESS TELEPHONE

(75) Inventors: Stephanie Petrakos; Edward A. Youngs, both of Boulder, CO (US)

(73) Assignee: Qwest Communications Int'l., Inc., Denver, CO (US)

(*) Notice: Subject to any disclaimer, the term of this patent is extended or adjusted under 35 U.S.C. 154(b) by 0 days.

(21) Appl. No.: 09/224,511

(22) Filed: Dec. 31, 1998

(51) Int. Cl.$^7$ .............................................. H04Q 7/20
(52) U.S. Cl. ................. 455/553; 455/74.1; 455/564; 379/355
(58) Field of Search ..................... 455/550, 564–565, 455/403, 462, 74.1, 426, 552, 553; 379/355

(56) References Cited

U.S. PATENT DOCUMENTS

| | | | |
|---|---|---|---|
| 4,775,997 A | * 10/1988 | West, Jr. et al. | 455/564 |
| 5,247,565 A | * 9/1993 | Joglekar et al. | 455/564 |
| 5,535,260 A |   7/1996 | Zicker et al. | 455/564 |
| 5,722,087 A | * 2/1998 | Ala-Mursula et al. | 455/564 |
| 5,812,651 A | * 9/1998 | Kaplan | 455/414 X |
| 5,963,875 A | * 10/1999 | Go | 455/564 |
| 6,061,443 A | * 5/2000 | Yablon | 379/355 |

* cited by examiner

Primary Examiner—Nay Maung
(74) Attorney, Agent, or Firm—Marsh, Fischmann & Breyfogle, LLP

(57) ABSTRACT

A wireless telephone which includes the functionality to operate in a plurality of dialing modes. When a wireless telephone is powered up and in an idle mode, a telephone user has the option of operating the phone in a first dialing mode which simulates the operation of a land line phone and a second dialing mode which is a wireless mode of operation. Either mode may be initiated without requiring any additional steps to be performed by the telephone user. In the first mode, the telephone user may depress a "Talk" button on the keypad of the wireless phone. A dial tone is transmitted through the speaker and at this point a telephone number may be entered through the keypad. After entry of the number and the passing of a timeout period, the telephone number is automatically transmitted to the telephone network in order to establish a telephonic connection. In the second mode, a telephone user begins by entering the telephone number into the memory. When entry is complete the "Talk" button may be depressed which acts to transmit the telephone number to the network.

14 Claims, 5 Drawing Sheets

| FIRST KEY | TOTAL NUMBER OF KEYS ENTERED FOR SHORT TIMEOUT | TOTAL NUMBER OF KEYS ENTERED FOR LONG TIMEOUT |
|---|---|---|
| * | 3, 4 | 1, 2, 5,+ |
| # | 5 | 1-4, 6+ |
| 1/0 | 8, 11 | 1-7, 9, 10, 12+ |
| 2-9 | 7, 10 | 1-6, 8, 9, 11+ |

FIG. 5

DUAL DIALING MODE WIRELESS TELEPHONE

FIELD OF THE INVENTION

The present invention relates to wireless telephone technology, and in particular to a wireless telephone which operates in a plurality of modes.

BACKGROUND OF THE INVENTION

As the use of cellular (wireless) phones have grown in recent times, the mode of operation of these phones has become better known to the segment of the population which operates these phones on a regular basis. To use a wireless phone it is necessary to perform a series of steps in a particular order. More specifically, once the wireless telephone has been powered up, a telephone user first inputs the telephone number of the desired destination through the numeric keys incorporated into a keypad. As the telephone numbers are entered, they are stored in memory. Upon completion of entry of the telephone number, the telephone user may then press a "talk" key which effects a transmission of the telephone number to the wireless telephone network. Once the entire number is received by the network, a connection may then be established between the wireless telephone user, and the party to be reached.

The above dialing of the wireless phone, may be contrasted with the more familiar dialing of a land line phone. In a land line mode of operation, a telephone user who wishes to use the phone will lift the phone receiver off its cradle which in turn activates a switch in the telephone mechanism. Through activation of this switch, a dial tone is provided to the earphone of the receiver. In the situation where a cordless land line phone is employed, a phone user would depress a "talk" button which would also activate a switch wherein the dial tone would be provided to the ear piece of the telephone. At this point, the telephone user may then enter the telephone number of the desired destination through the keypad. Generally, when a telephone goes off hook, a circuit is established between the telephone and a central office. The central office typically includes equipment which manages the call origination process. The dial tone provides a feedback which informs the telephone user that the system is awaiting the user's input. After the first digit is dialed, the central office removes the dial tone. As the user continues to dial digits, each number received is analyzed at the central office to determine routing and call charges and to determine when an entire phone number has been dialed. Based on the number of digits and which digits were entered into the system, the central office may then connect the telephone user with the desired destination.

SUMMARY OF THE INVENTION

The inventors have recognized that there may be telephone users who wish to use a wireless telephone but are not familiar with the wireless mode of dialing or prefer the land line mode of dialing when operating a telephone. Conversely, there may be some wireless telephone users that prefer the wireless mode of dialing. The inventors have further recognized that it would be advantageous to provide a wireless telephone which dials in either mode and does not require any additional operational steps in order to initiate the desired mode.

Disclosed herein is a method of dialing for a wireless telephone in a plurality of modes, wherein initial operations performed by the telephone user determine which mode the telephone will dial in. In an initial step for entering and transmitting a phone number to a telephone network, a system user depresses either a numeric button for a first digit of the number to be dialed, or depresses a non-numeric button such as a "Talk" button. If a numeric button is first depressed, this may indicate that the system user wishes to dial the phone in a wireless mode. According to the wireless mode, the telephone user will continue entering the telephone number, be it local (7 or 10 digits) or long distance (11 digits or more). When the telephone user has completed entering digits into the telephone, a functional, non-numeric button is depressed which transmits the telephone number to the telephone network in order to establish a telephonic connection.

In the second, or land line, mode of dialing, the telephone user may first depress the non-numeric button. Once the depression of this first, non-numeric, button is detected, a dial tone may be provided to the telephone user. Upon depression of the first numeric button by the telephone user, the dial tone may be removed and the remaining digits of the telephone number may be received. Upon entry of a predetermined number and selection of numerical digits into memory or the passing of predetermined period of time, or combination of number of digits and time, the digits may be transmitted by the telephone to the telephone network. At this point a telephonic connection with the destination may be established.

In one aspect of the invention, when the first button depression detected is a non-numeric button (land line mode), a plurality of timeout periods may be begun based on the selection and number of digits entered by the telephone user. A timeout period is the period of time which passes after each digit is entered before the information stored in memory may be transmitted. Further, timeout periods of different lengths may be employed. The application of these timeout periods may depend upon the identity of the first numeric button depressed by the telephone user and a running count kept of all digits entered in memory. For example, the first number entered by the telephone user may indicate what type of call is going to be placed. If the digit is 1 this indicates a long distance call. In this situation a short timeout period may be initiated for transmitting the information after the running count reaches 11. All other numbers (except 8) will initiate a long timeout period before the information is transmitted.

In yet another aspect of the invention, different time-out periods may be employed when non-numeric and numeric buttons are depressed in a particular sequence. The non-numeric keys may be employed to initiate functions such as phone number recall, last number redial, call forwarding, and any number of automated or semi-automated functions incorporated into a wireless phone.

In yet another aspect of the invention, a wireless telephone apparatus is specially adapted to operate in multiple dialing modes. In particular, the wireless phone includes a controller which has a timer function and a memory incorporated therein. The controller may be in connection with a keypad, an information display, and a tone generator. Connections may also be established with a microphone, a speaker, and a transmitter/receiver device. The controller is programmed to, based on the first digit entered through the keypad, initiate either a land line mode of dialing or a wireless mode of dialing.

The land line mode may be initiated when a non-numeric key is first depressed. After this mode has been initiated, the dial tone generator provides a dial tone to the speaker of the telephone. Upon depression of a numeric button the dial tone generator may be signaled to remove the dial tone. The digits of a phone number entered through the key pad may then be stored in memory. When entry of digits is no longer detected, and a predetermined timeout period has passed, the number stored in memory may then be transmitted from the telephone.

In yet another aspect of the invention, the controller may identify the first digit entered for the telephone number. Based on this identification, different timeout periods may be initiated depending on the number of digits entered up to that point.

In the wireless mode, the telephone numbers which are entered through the keypad are stored in the memory. When all numbers for the number entered, the telephone user may depress a non-numeric key which provides for the transmission of the telephone number to the telephone network.

Numerous modifications and additions will be apparent to those skilled in the art upon further consideration of the invention.

BRIEF DESCRIPTION OF THE DRAWINGS

FIG. 5 is a table which discloses the application of the short and long timeout periods.

BRIEF DESCRIPTION

Figure 1:
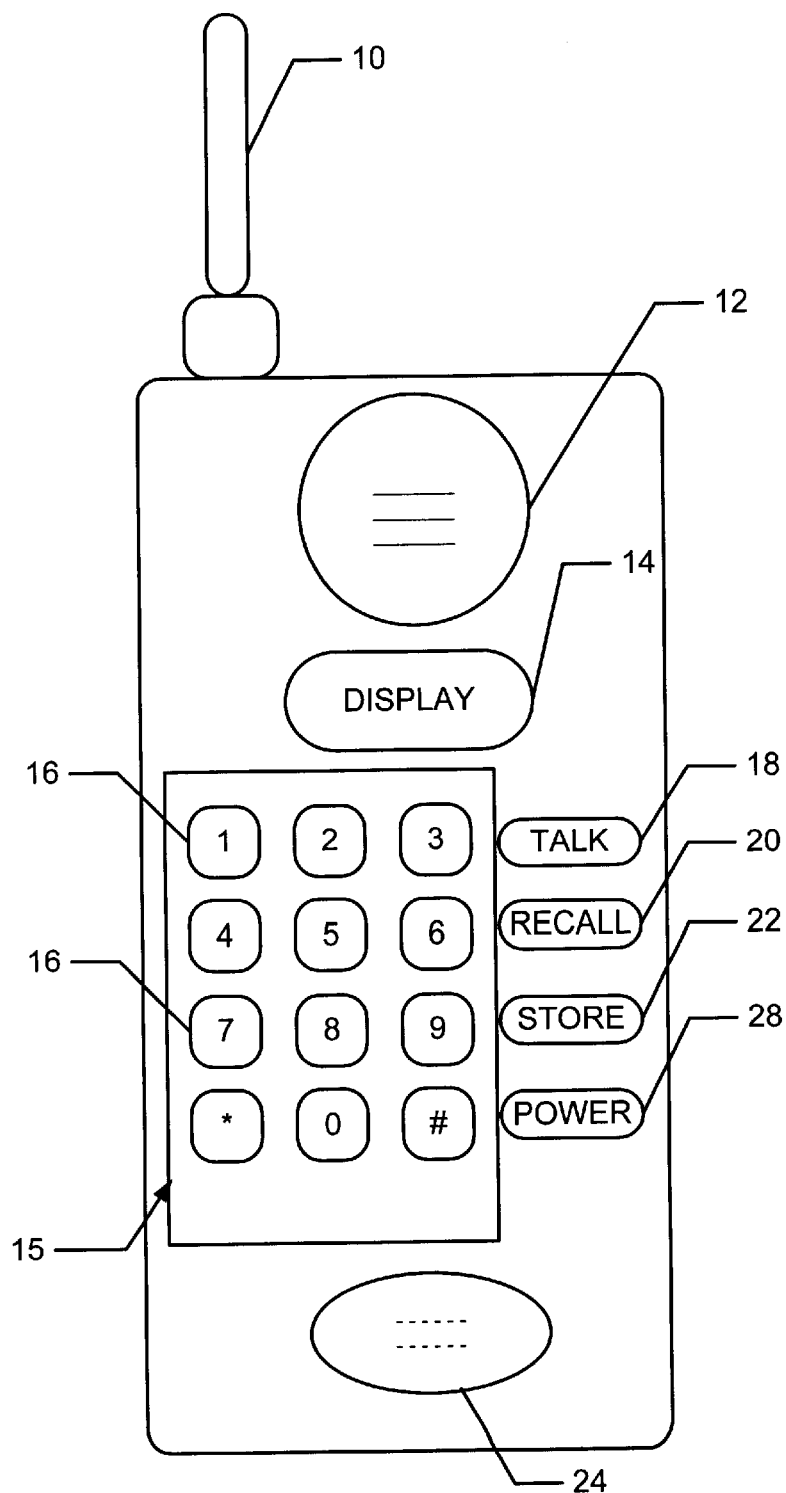
FIG. 1 discloses a cellular phone including a keypad for entering numeric and non-numeric information.

Disclosed in FIG. 1 is a front view of a hand held wireless phone. This type of phone allows a telephone user to establish a telephonic connection with a remotely located telephone user through use of a wireless telephone network. Incorporated into the cellular phone is the antenna 10 which facilitates the transmission and receipt of signals with the wireless network. The speaker 12 and the microphone 24 allow for the transfer of audio information to and from the telephone user. A visual display 14 provides for the viewing of alphanumeric information. Through this display the telephone user may view data such as incoming and outgoing telephone numbers, alphanumeric messages, etc.

Below the display 14 is keypad 15 which provides for the manual entry of information into the telephone. Numerical buttons 16 provide for the manual entry of numbers, or digits. Included with the numerical keys are the # and * keys. A number of non-numeric buttons are also incorporated into the phone which provide the functionality to perform a number of additional tasks. The activation of "talk" button 18 provides for the initiation of the land line mode of dialing, or the transmission of information in the wireless mode. These modes of operation will be described in greater detail below. The recall button 20 and store button 22 provide for various telephone related functions, such as storing a telephone number in memory or recalling the same. The power button 28 provides for turning on and off the wireless telephone.

Figure 2:
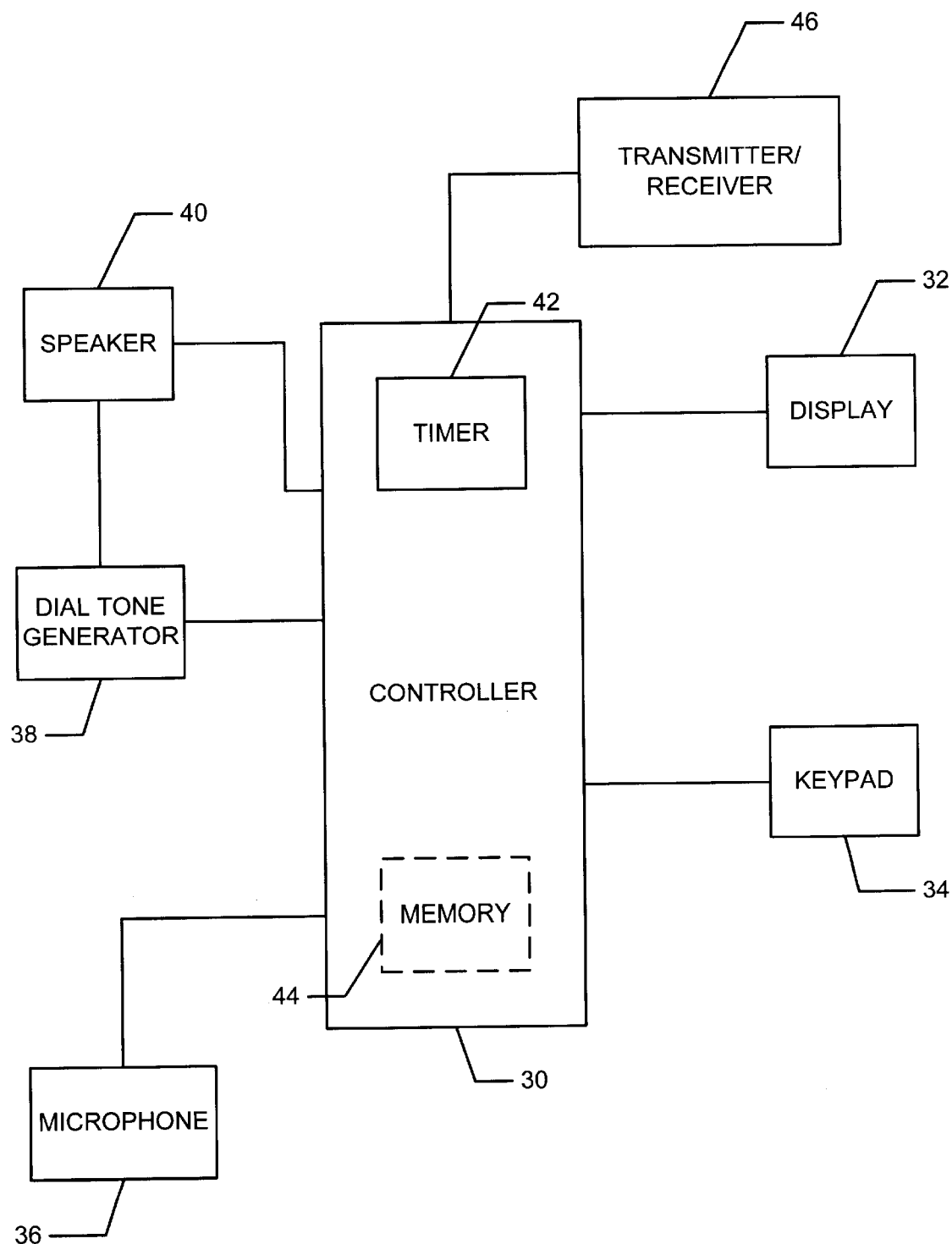
FIG. 2 discloses a system diagram for the cellular telephone.

Disclosed in FIG. 2 is a system diagram for the electronic makeup of the wireless telephone. The central component of the wireless phone is the controller 30. A number of the major components of the wireless phone are tied in through the controller. A number of other components are integrated directly into the controller. Communication with the telephone network is provided through transmitter/receiver 46. This particular component provides for the receipt of data transmitted from the telephone network and also provides for the transmission of voice or other data generated by the phone to the telephone network. Also connected to the controller 30 are the display 32 the keypad 34. The keypad 34 transmits the digits and other command signals entered by the telephone user to the controller. Various types of information may be transmitted from the controller to display 32 for viewing by the telephone user.

Also in connection with the controller 30 is the dial tone generator 38. When the wireless phone is operating in the land line mode a dial tone may be provided to the speaker 40. Further connections are also established between the controller and the speaker 40 and microphone 36. Voice information either received or transmitted to these components is processed through controller 30.This voice information is then transmitted to the telephone network through the transmitter-receiver 46.

Incorporated into the controller 30 are two additional elements. The first element is memory 44 which acts as a buffer for temporarily storing numbers and other commands entered through the keypad before this information is transmitted to the telephone network. The other component of the controller is the timer 42. This timer, in response to commands from the controller, counts out various timeout intervals depending on the digits and other information entered through the keypad.

The wireless telephone described herein provides the functionality to operate in at least two different dialing modes. A number of phone users desire to have a wireless phone which operates in a similar manner to the phone which they have at home. A number of other wireless phone users are most familiar with how a cellular phone currently operates and prefer having the telephone operate in that mode. The wireless telephone described herein provides dialing operation in both modes without the need to perform any additional operational steps. In particular, the wireless phone described herein operates in a manner similar to most commercially available cordless phones.

On a general level, the wireless phone described herein provides that once the telephone is activated, the telephone user may choose the mode of dialing operation through the first button which is depressed when placing a call. For example, if the system user selects the talk button 18, as shown in FIG. 1, as the first button which is depressed (as one would do for the operation of a cordless land line telephone), the wireless mode will be initiated. The first thing that will occur will be the transmission of a dial tone over the speaker. As described above this dial tone is generated through the dial tone generator 38 disclosed in FIG. 2. The telephone user may then enter the telephone number of the destination through the key pad, and all digits entered are stored in memory 44. After entry of a phone number in memory, and the passing of a timeout period, the phone number is automatically transmitted from the memory through the transmitter-receiver 46 to the telephone network. Once this telephonic connection is established, the telephone user may then carry on a telephone conversation.

If instead of depressing the talk button 18, the telephone user depresses a numerical button and begins entering the digits of a phone number into the memory, the controller detects this and determines that the wireless telephone will now operate in the wireless mode. In this mode, all the digits entered through the keypad are stored in the memory. Once the telephone user completes the entry of numbers and depresses the talk button 18, the telephone number is then transmitted to the telephone network and a telephonic connection may be established.

In either the land line or wireless mode, various functions which are initiated either through depression of the star key, the pound key, the recall or store key may be employed. Through activation of these functions, the services provided by the telephone companies may also be used in the mode they are typically employed.

Figure 3:
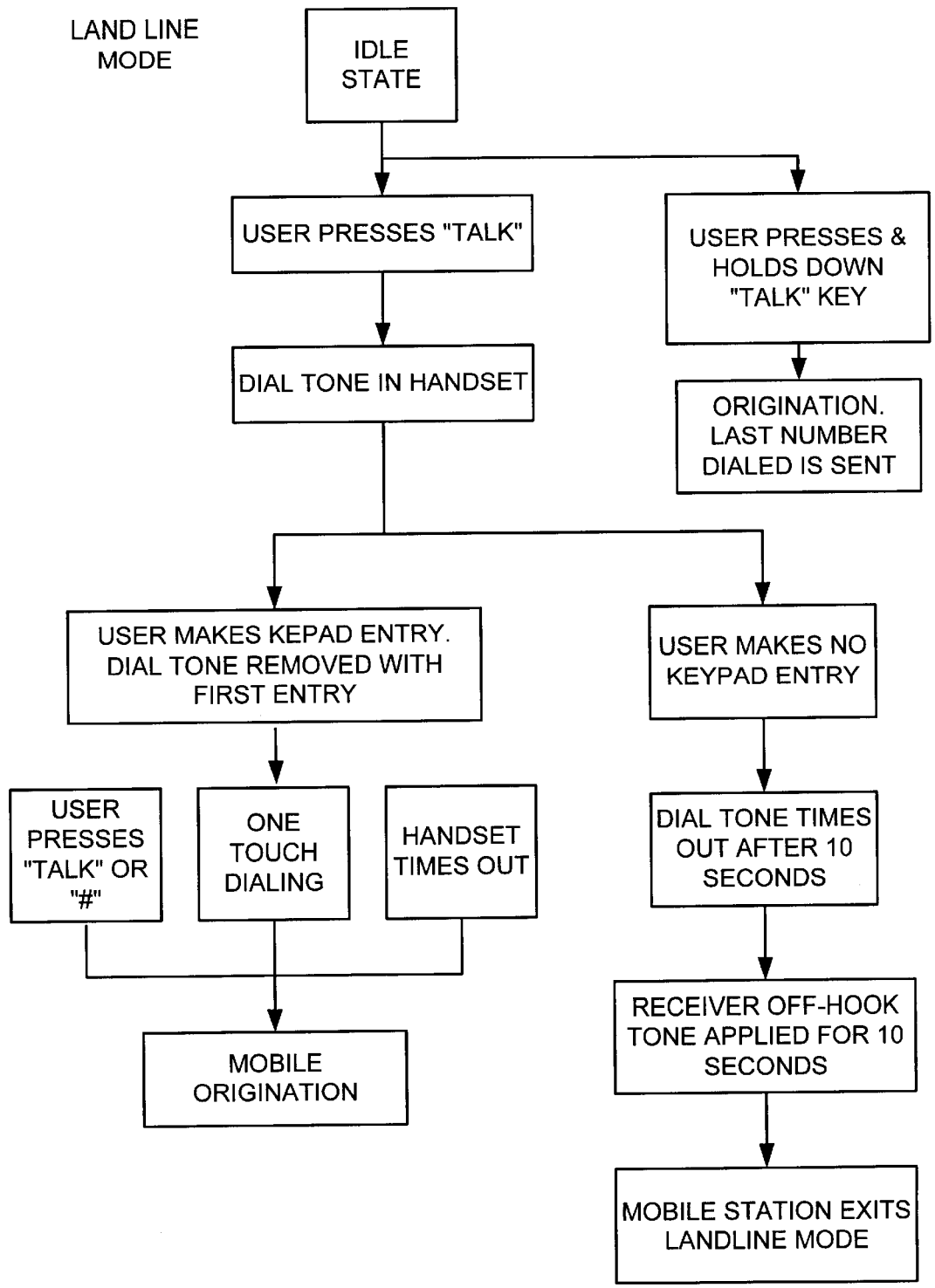
FIG. 3 discloses a flow chart for operation the wireless phone in the land line mode.

Disclosed in FIG. 3 is a flow chart which describes in detail the operation of a wireless phone in the land line mode. To initiate the land line mode the user initially presses the talk button when placing a telephone call. In the situation where the user wishes to retransmit the last number sent, the user would then press and hold down the talk key. The last number is then retransmitted and telephone connection may then be established.

If the system user wishes to enter a new telephone number, the short depression of the "Talk" button will initiate the dial tone through the speaker. The user then begins entering the phone number through the keypad. Upon entry of the first digit, the dial tone will be removed. After the entire number has been entered a number of options are available to the telephone user. Upon entry of the last digit, a timeout period will begin and upon its completion the telephone number is transmitted. The telephone user also has the option of pushing the talk or pound button upon completion of entering the telephone number and this avoids waiting for the timeout period to end and provides for the instantaneous transmission of the telephone number. In a land line phone, depressing the pound key upon completion of entry of a telephone number will signal the switch that the connection is ready to be established.

Returning again to the first step after the "Talk" button has been depressed, the system user may also employ various one touch features in order to place a call. For example, a number of functions allow the user to press star and then a series of numbers to either recall a phone number, redial the last number dialed, or employ a variety of call processing functions. Once these button depressions are detected, the information may then be transmitted to the telephone network.

In the situation where the user makes no keypad entries into the phone once the talk button has been depressed, the dial tone will time out after a predetermined timeout period. Once the dial tone times out, a receiver off hook tone will then be applied for a second period of time. If the phone user does not take any action at that point, the telephone will then exit the land line mode and return to idle state in the wireless mode.

Figure 4:
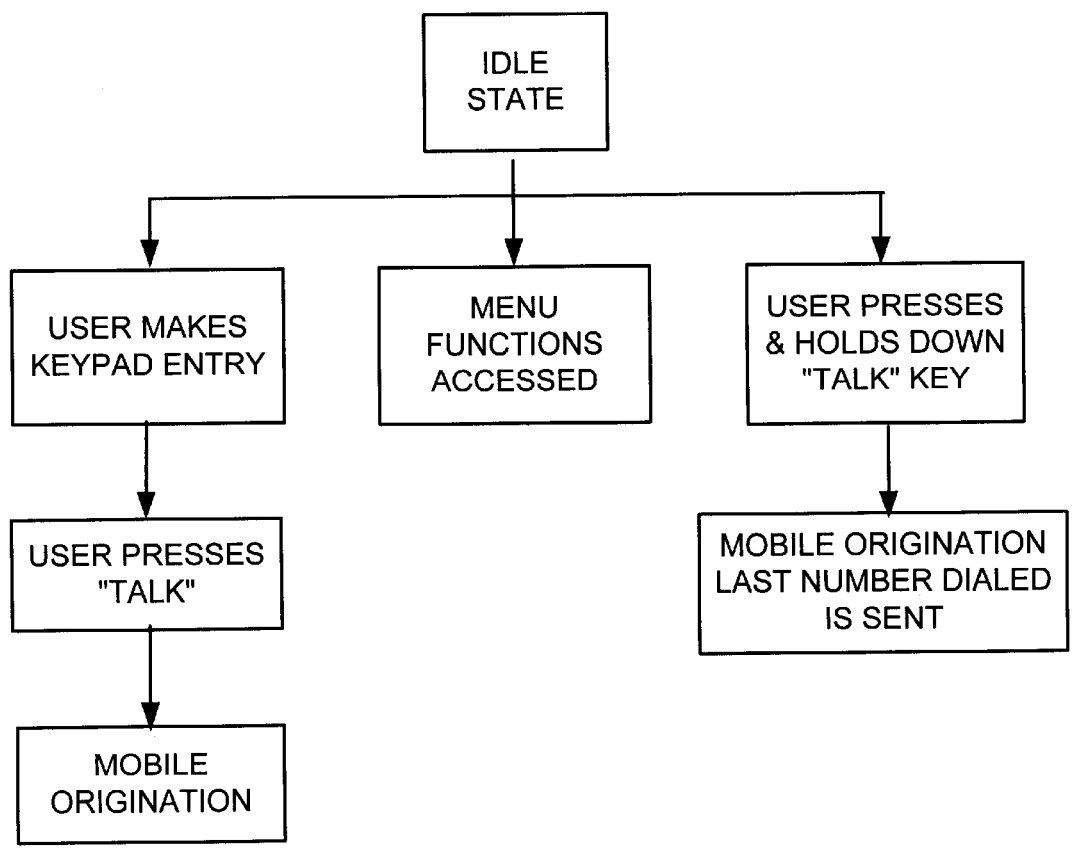
FIG. 4 discloses a flow chart which describes the operation of the wireless phone in the wireless mode.

Disclosed in FIG. 4 is a flow chart which describes in detail the operation of the wireless phone in the wireless mode. Initially, once the phone is switched on and in the idle mode a number of options are available to the phone user. The first option is for the telephone user to make an entry through the keypad. The telephone number entered will temporarily be stored in memory, and once the telephone user presses the talk button, the number is transmitted to the network and a telephonic connection may be established.

The second option available to the telephone user in the wireless mode is to simply press one of the menu functions, and perform a number of functions related to either the maintenance or automated features incorporated into the phone. The final option for the telephone user is to press and hold down the talk key. Once this is done, the last number dialed is retransmitted to the telephone network.

It is known in land line phones that when a sufficient number of digits have been entered into the switch, a telephonic connection will be established shortly thereafter. In the situation where a pause occurs before a full telephone number is entered, a relatively long period of time will pass before any action is taken. In order to better duplicate a land line telephone, additional functionality may be incorporated into the wireless telephone described herein. Through use of preprogrammed timeout periods, the wireless telephone in the land line mode can initiate the timeouts at the appropriate time in order to closely mimic the operation of the land line telephone. The controller keeps a running count of the number of digits entered by the telephone user at any point in time and based on this count initiates the appropriate timeout period. A timeout period is the amount of time which may be allowed to pass between each digit entry before the system takes further action. Every time a digit is entered, the previous timeout period is ended and a new one is begun.

If a telephone user wishes to make a local phone call, once the telephone number has been completely entered into the memory, it would not be desirable to wait for an extended period of time in order for the information to be transmitted to the network. Conversely, if the telephone user had only entered four or five digits into memory, and for some reason a delay was caused, a short time-out period before the digits stored in memory are transmitted would not be desirable. The wireless telephone described herein, provides the functionality that depending on the first digit entered, in conjunction with the counted number of digits entered thereafter, the appropriate time-out period may be initiated.

Disclosed in FIG. 5 is a table which correlates the first numerical key depressed with the type of time-out which may be employed depending on the number of button depressions detected thereafter. In the first column are the possible first numerical keys which may be depressed to perform different functions. For purposes of this application, depression of the star key first indicates that the telephone user wishes to perform a particular network dial type of function. Typically, in order to employ the network dial functions, a two or three digit number must be entered thereafter. This type of function does not work when either a one, two, or five or greater number of digits are entered. The functions will work when two or three digits are entered after the star key. In the example described herein, a short time-out period (typically three seconds) will be initiated when the detected number of entered digits after the star key is two or three. A long timeout period (typically 10 seconds) will be applied for all other numbers of entered digits. So in the example where the telephone user wishes to use the network function, if the star key is pressed and then just one number, the system will wait for ten seconds in order to perform the next function. If the system user either enters two or three digits, the system will wait only three seconds before retrieving the entry from memory and then transmitting the number to the telephone network.

In the situation where a different network service function may be employed, the telephone user must first depress the pound key and then a five digit number. If the system user presses anything less than five digits or anything greater than five digits, a long time-out period will be initiated before any functions are carried out. If the system detects the entry of a five digit number, a short time-out period will be employed before any functions are carried out.

If a telephone user wishes to make a direct or operator assisted long-distance phone call, the first key which would be depressed would be either the one or zero key. At the present time, as is well known in the telephone industry, a long distance telephone number may either be 1-NAA-XXXX or it may be 1-NNA-NAA-XXXX which are essentially either eight or eleven digit numbers, including the first number entered. According to the table in FIG. 5 a long time-out period would occur for any entries which are less than eight digits, between eight and eleven digits, or greater than eleven digits. If either an eight or eleven digit number is then entered, the short time-out period is then initiated and the telephone number entered can be transmitted to the telephone network.

In the situation, where the telephone user wishes to make a local phone call, it is well known that local phone calls are either seven or ten digits long. These phone numbers may start with any number except zero or one. In this final scenario, if it is detected that any number less than seven, between seven and ten, or greater than ten is detected, a long time-out period will be initiated before any further action is taken. If the number entered is either seven or ten digits long, including the first number, then the short time-out period will be initiated. At that point, once the timeout period expires the telephone number is transmitted to the telephone network.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method of operating a cellular phone in a plurality of dialing modes comprising:
   detecting depression of a first button;
   initiating a first mode when the first button depressed is a activation button, wherein the first mode comprises the steps of:
      providing a dial tone to a speaker incorporated in the cellular phone
      upon detection of depression of a first numerical button, deactivating the dial tone;
      storing in a memory numerical information relating to the first numerical button depressed and all numerical buttons depressed thereafter; and
      upon completion of entry of all the numerical information into the memory, transmitting the numerical information to establish a telephonic connection; and
   initiating a second mode when the first button depressed is a numerical button, wherein the second mode comprises the steps of:
      storing in the memory the first numerical button depressed and all the numerical buttons depressed thereafter; and
      upon detection of the activation button being depressed, transmitting the numerical information stored in memory in order to establish a telephonic connection.

2. The method of claim 1 wherein the first mode simulates operation of a land line telephone.

3. The method of claim 1 wherein the second mode is simulates operation of a wireless telephone.

4. The method of claim 1 wherein the step of transmitting the numerical information will occur a predetermined timeout period after the last detected depression of one of the numerical buttons.

5. The method of claim 4 further comprising the steps of:
   identifying a short timeout period and a long timeout period;
   identifying the first numerical button depressed;
   providing a running count of the numeric buttons depressed; and
   based on first numeric button depressed and the running count, initiating either a short or a long timeout period after detection of the last numeric button depressed before the numeric information stored in the memory is transmitted.

6. The method of claim 5 wherein if the identified first numeric key is 1 or 0, the short timeout period will be initiated when the running count is 8 or 11 and the long timeout will be initiated for all other of the running counts.

7. The method of claim 5 wherein if the identified first numeric key is any number except 1 or 0 the short timeout period will be initiated when the running count is 7 or 10, and the long timeout period will be initiated for all other of the running counts.

8. The method of claim 5 wherein if the identified first numerical key is a * key, the short timeout period will be initiated when the running count is 2 or 3 and the long timeout will be initiated for all other of the running counts.

9. The method of claim 5 wherein if the identified first numerical key is a # key, the short timeout period will be initiated when the running count is 5 and the long timeout will be initiated for all other of the running counts.

10. A wireless telephone apparatus comprising:
    a keypad comprising a plurality of numerical buttons and a activation button which when depressed transmit a distinct data signals;
    a controller which receives the distinct data signals and identifies whether one of the numerical buttons or the activation button is first depressed in attempting to establish a telephonic connection, and in response to the first detected depression of the activation button initiates a land line mode of dialing and in response to the first detected depression of one of the numerical buttons initiates a wireless mode of dialing;
    a memory for storing digits entered through depression of numerical buttons; and
    a transmitter/receiver which transmits the digits stored in the memory in order to establish a telephonic connection upon completion of either the first or second mode.

11. The apparatus of claim 10 wherein the land line comprises the steps of:
    providing a dial tone to a speaker incorporated in the cellular phone;
    upon detection of depression of a first digit, deactivating the dial tone;
    storing in memory the first digit depressed and all digits subsequently depressed thereafter; and
    upon completion of entry of the digits in the memory, transmitting the digits and establishing a telephonic connection.

12. The apparatus of claim 10 wherein the wireless mode comprises the steps of:
  storing in memory a first digit depressed and all digits subsequently depressed; and
  upon detection of the engagement button being depressed, transmitting the digits and establishing a telephonic connection.

13. The apparatus of claim 10 further including a timer in connection with the controller which measures periods of time between the depression of the numeric buttons.

14. The apparatus of claim 10 wherein the controller includes a counter which provides a running count of the numeric digits entered into memory.

* * * * *